John Ashcroft.
Apparatus for Roasting Coffee, &c.

No. 119,959. Patented Oct. 17, 1871.

Witnesses: Inventor: John Ashcroft

119,959

UNITED STATES PATENT OFFICE.

JOHN ASHCROFT, OF BROOKLYN, NEW YORK, ASSIGNOR TO SARAH JANE ASHCROFT, OF SAME PLACE.

IMPROVEMENT IN COFFEE-ROASTERS.

Specification forming part of Letters Patent No. 119,959, dated October 17, 1871.

*To all whom it may concern:*

Be it known that I, JOHN ASHCROFT, of Brooklyn, county of Kings and State of New York, have invented certain Improvements in Apparatus for Roasting Coffee, of which the following is a specification:

The nature and object of my invention consist in roasting coffee (by the apparatus to be hereinafter described) so that while it loses little or, comparatively speaking, nothing, in weight the aroma or flavoring oil of the berry or bean is preserved and not dissipated as usual, thus effecting two desirable objects not heretofore so perfectly attained; at the same time the coffee-bean is not shrunk as usual, but rather expanded, and there is less liability of burning. By my process the roasted berry contains more oily substance, and, when ground and liquored, cannot be compared in richness and body to what has heretofore been prepared—it being superior.

Generally from twelve to twenty per cent. has been lost in roasting, varying upon the kind and dryness or maturity of the bean or berry. Fifteen per cent. may be said to be the average of Rio, Java, Maracaibo. White Jamaica loses twenty per cent.

The slightest gain, of two and one-half or five per cent., on the importations (every pound of which is consumed directly in this country) will yield large results, or lead to a very considerable reduction in the price of the article.

Figure 1:
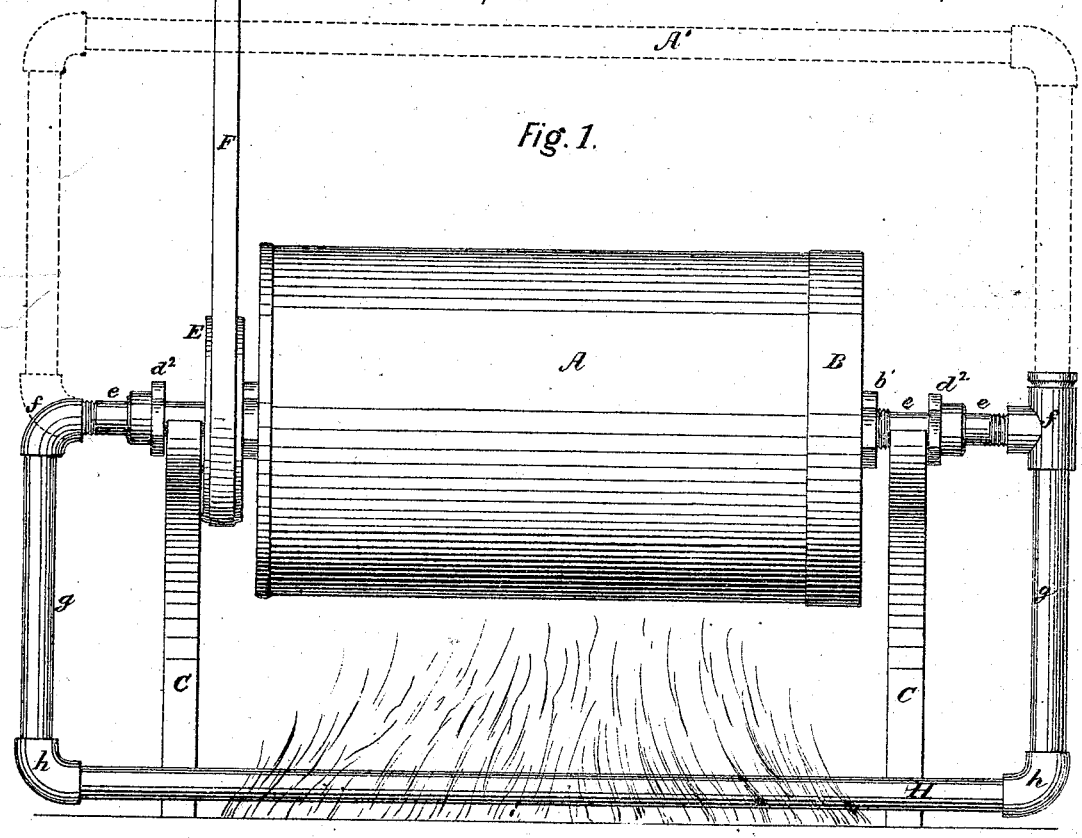

In the drawing, Figure 1 represents an elevation of my apparatus, A being a sheet-metal cylinder with a removable end or cap, B. C are standards, supporting the cylinder on a hollow perforated shaft, D, on which is a pulley, E, and over which runs a belt, F, by means of which the cylinder A is revolved during the roasting process, as also the inner wired or opened (meshed) cylinder G inside of it, and in which the green coffee is put. It (G) has also a removable end, $a$. A and G are kept in position on their hollow shaft D by lock or screw-nuts $b$ and $b'$, the pulley E on one end serving the place of $b'$ on the other end of the outside cylinder. The shaft D is perforated as seen at $c$, and outside of this part is a shield, $d$, the purpose of which will be hereinafter explained. The hollow shaft or arbor D is connected, by a hollow screw-nut or revolving union, $d^2$, at each end, to hollow connections $e$, upon which the cylinders A and G revolve.

Figures 2, 3:
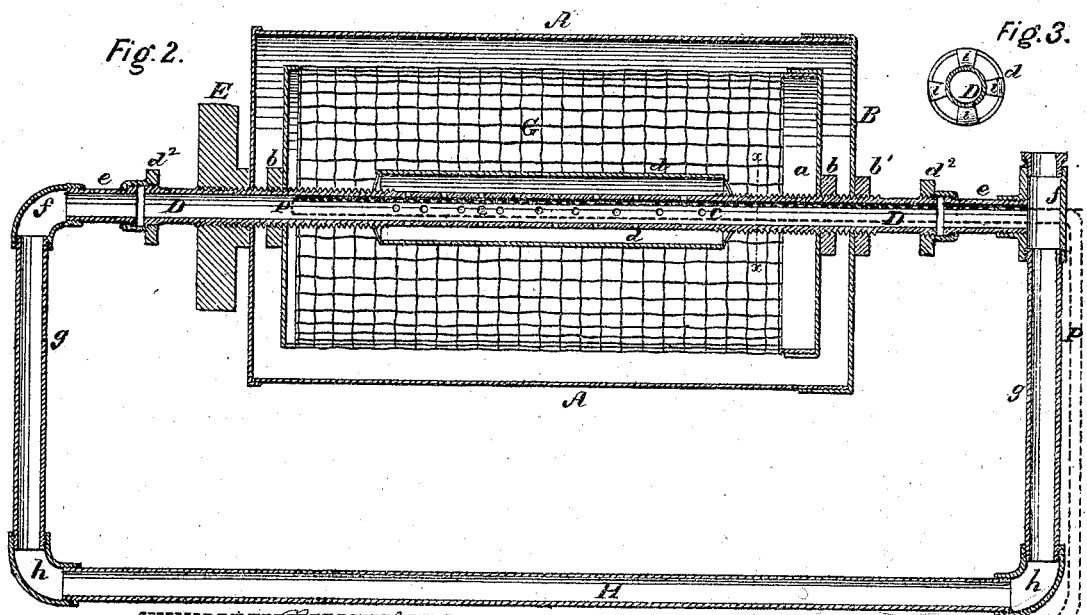

Fig. 2 represents a vertical longitudinal section of the apparatus. Fig. 3 shows a section on line $x\ x$, Fig. 2, representing an end view of the shield or jacket $d$ and pipe D. The ends of this jacket are not closed, as will be seen at $i$, Fig. 3.

Beyond $e$ are hollow joints or connections, which are attached to pipes $g$ by means of elbowed or straight connections $f$; and these pipes $g$ again, by means of elbow or equivalent joints $h$, connect with another horizontal pipe, H. After the pipes H and $g$ have performed their functions—after heating and roasting—they may be turned up or out of the heating apparatus, as seen at A', Fig. 1.

The operation is as follows: The cylinder A and the inclosed one G are properly supported, as seen by standard C, over a fire, the cylinder A being exposed to heat, as also the metallic pipe H, as seen by Fig. 1. In all green coffees there are more or less moisture and oils, the latter of which it is most desirable to preserve. The heat, acting on the cylinder A, and through it on the coffee in the cylinder G, will expel more or less of the moisture and oil of the coffee. This will naturally get into the perforated hollow arbor D, the shield $d$ preventing any dirt or dust from choking up any of the passages $c$ in said arbor. This condensed moisture (water, oil, &c.) will pass into pipes $g$ and H, and the latter, being highly heated, drives it back; and as the coffee has become more dried and brown it more readily absorbs the moisture. Aroma or oil and water swells the grains more or less, and it retains what was before driven off. This repeated experiment has proven.

In order to facilitate or hasten the operation of my roasting apparatus by the addition of properly-applied heat, I propose making use of an accessory pipe, P, shown in dotted outline in Fig. 2. This is formed in U-shape, closed at both ends, and containing a small quantity of water to prevent its burning out, &c. One leg is parallel or nearly so to pipe H. This leg is intended to be more positively exposed to heat or the fire than pipe H. It passes up along $g$, through connection $f$, through pipe $e$, through arbor pipe D, terminating at or near one end of inner cylinder G. This pipe P, although having water in it, may be made red or nearly red hot throughout its entire length, such fact having been practically demonstrated. The coffee in the revolving cylinder G is exposed, under these circumstances, to a heat from the center or inside, as it were, as also from the outside through the cylinder A, the former passing through pipes H and P. The heat afforded from pipes P and H disseminates itself from the center to the periphery or outside of the cylinder; hence the roasting becomes uniform, the heat afforded from the cylinder A passing in radially from the outside.

Having thus described my invention, what I claim as new, and desire to secure by Letters Patent of the United States, is—

1. In an apparatus for roasting coffee, a hollow heating-iron, H, arranged to communicate with a reticulated inclosed cylinder, G, so as to receive the deposit of oil or condensed moisture from the coffee therein and send it back in highly-heated vapor to be absorbed by the dry coffee by the action of the heating-iron, as described.

2. A hollow heating-iron, H, connected with a revolving coffee-holder, A G, by hollow couplings $d^2$, so as to be turned up out of the fire when the roasting is finished, as described.

3. The pipe H and its several connections in combination with the axial perforated pipe D and cylinders A and G, as and for the purpose set forth.

4. The guard or jacket $d$ in combination with the perforated pipe $c$, as and for the purpose set forth.

5. The auxiliary pipe P in combination with the perforated pipe E, as and for the purpose set forth.

6. The combination and arrangement of the pipes P H and connections, perforated pipe D, jacket $d$, and cylinders A and G, for the purpose set forth.

JOHN ASHCROFT.

Witnesses:
   FRED. ARTÓS,
   GODF. MATHYS. (154)